United States Patent Office 2,813,098
Patented Nov. 12, 1957

2,813,098
3-METHOXY-N-METHYLMORPHINAN N-OXIDE

Burris D. Tiffany, Kalamazoo, Mich., assignor to The Upjohn Company, Kalamazoo, Mich., a corporation of Michigan No Drawing. Application August 16, 1955,
Serial No. 528,804

4 Claims. (Cl. 260—285)

This invention relates to new organic compounds and is particularly directed to 3-methoxy-N-methylmorphinan N-oxide either as the free base or as an acid addition salt thereof.

It is an object of the invention to provide novel physiologically active compounds. It is a further object to provide novel antitussives. It is a further object to provide novel compounds which are safe and effective for this purpose and have a higher therapeutic index than the corresponding tertiary amine.

These and other objects are accomplished in the novel compounds of the invention which are represented by the following basic formula:

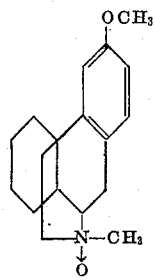

and can exist and can be used for the purposes of the invention in the form of the free base or an acid addition salt thereof with a pharmacologically acceptable acid such as hydrochloric, hydrobromic, hydriodic, sulfuric, phosphoric, nitric, acetic, benzoic, salicyclic, glycolic, succinic, nicotinic, tartaric, maleic, malic, lactic acids, and the like.

The invention may be more fully understood by the following examples which are illustrative only and not to be construed as limiting.

*Example 1.—3-methoxy-N-methylmorphinan N-oxide free base*

In a 250-milliliter Erlenmeyer flask 3.4 grams (0.0124 mole) of crude d-3-methoxy-N-methylmorphinan was dissolved in fifty milliliters of absolute methanol and three milliliters of thirty percent aqueous hydrogen peroxide was added with stirring. The mixture was kept under nitrogen at room temperature for six days and then was treated with an aqueous slurry of thirty percent palladium-on-carbon catalyst which caused fairly vigorous gas evolution. After three hours stirring, the mixture gave a negative peroxide test with ferrous thiocyanate reagent. A filter aid was added and the mixture was filtered. The clear filtrate yielded 3-methoxy-N-methylmorphinan N-oxide free base as a gum upon concentration by warming under a stream of nitrogen.

*Example 2.—3-methoxy-N-methylmorphinan N-oxide hydrochloride*

The gum obtained in Example 1 was dissolved in fifty milliliters of ethyl acetate; the solution was treated with decolorizing charcoal and filtered. A stream of anhydrous hydrogen chloride was slowly passed over the clear filtrate, during which the solution gradually became turbid. The solution was cooled and crystals appeared. These were recovered by filtration, washed with ethyl acetate, and dried, to obtain white, crystalline 3-methoxy-N-methylmorphinan N-oxide hydrochloride weighing 2.75 grams and having a melting point of 195–200 degrees centigrade. An additional 0.55 gram of the same product was obtained from the filtrate. Thus the total yield was 3.3 grams (81 percent).

*Analysis.*—Calc. for $C_{18}H_{26}ClNO_2$: C, 66.75; H, 8.10; Cl, 10.95. Found: C, 66.96; H, 8.09; Cl, 10.70.

In place of the d-3-methoxy-N-methylmorphinan as the starting material for Examples 1 and 2, there may be substituted either the l-isomer or the racemate.

In place of hydrochloric acid there may be substituted appropriate acids to obtain the hydrobromide, the hydroiodide, the sulfate, the phosphate, the nitrate, the acetate, the benzoate, the salicylate, the glycolate, the succinate, the nicotinate, the tartrate, the maleate, the malate, the lactate, and the like.

The novel compounds of this invention can be used for the same purposes and in the same dosage forms, such as tablets, injectables, and elixirs, as 3-methoxy-N-methylmorphinan and the salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 3-methoxy-N-methylmorphinan N-oxide.
2. 3-methoxy-N-methylmorphinan N-oxide free base.
3. 3-methoxy-N-methylmorphinan N-oxide acid addition salt of a pharmacologically acceptable acid.
4. 3-methoxy-N-methylmorphinan N-oxide hydrochloride.

References Cited in the file of this patent
FOREIGN PATENTS 293,812    Switzerland _____ Jan. 4, 1954